April 2, 1946.     T. H. NAKKEN ET AL     2,397,804
VIBRATION AND SHOCK MOUNTING FOR FRAGILE INSTRUMENTS
Filed Feb. 12, 1944     2 Sheets-Sheet 1

INVENTOR.
THEODORE H. NAKKEN
BY ROBERT L. STONE
H. G. Manning
ATTY.

UNITED STATES PATENT OFFICE 2,397,804

VIBRATION AND SHOCK MOUNTING FOR FRAGILE INSTRUMENTS

Theodore H. Nakken, New Haven, and Robert L. Stone, Orange, Conn., assignors to The Soundscriber Corporation, New Haven, Conn., a corporation of Connecticut Application February 12, 1944, Serial No. 522,112

8 Claims. (Cl. 248—358)

This invention relates to shock-absorbing mountings, and more particularly to a mounting for sound recording equipment and other sensitive instruments, when used in mobile vehicles, such as trucks, tanks, airplanes, boats, etc.

Previous shock mountings for sensitive instruments were generally provided with various types of rubber diaphragms having frequencies of the order of 600 to 1800 cycles per minute, but such diaphragms did not give three-dimensional vibration filtering or insulate the instrument from vibrations of a low frequency received from the supporting vehicle.

It is a well-known fact that filtering of impressed vibrations which are above the natural period of vibration of the instrument will be far more efficient than when the impressed vibrations are below said natural period.

One object of the present invention is to provide an improved suspension for delicate, fragile, sensitive instruments and apparatuses, which will effectively insulate it from vibrations and shocks occurring in all three dimensions, and in which the vibrational period of the instrument and its mounting has been reduced to the order of 150 to 600 cycles per minute in order to obtain the most effective filtering of relatively low frequency impressed vibrations.

A further object of the present invention is to provide an instrument mounting comprising conical coiled springs in combination with soft snubber members located between the instrument and its base in order to efficiently absorb vibrations and shocks.

A further object is to provide a shock-absorbing mounting of the above nature including a U-shaped snubber-carrying bracket and a vertical supporting post concentrically mounted therein, the later being attached at one end to the bracket by means of a coiled conical spring, and at the other end to the instrument.

A further object is to provide a shock-absorbing mounting of the above nature in which the conical spring is normally compressed so that all of the convolutions thereof will lie compactly in a single horizontal plane, whereby said spring will have substantially equally stiffness to vibration in three directions.

A further object is to provide a device of the above nature which will be simple in construction, inexpensive to manufacture, easy to install and manipulate, compact, adaptable to a wide range of weights, ornamental in appearance, and very efficient and durable in use.

With these and other objects in view, there have been illustrated on the accompanying drawings several forms in which the invention may conveniently be embodied in practice.

Figure 1:
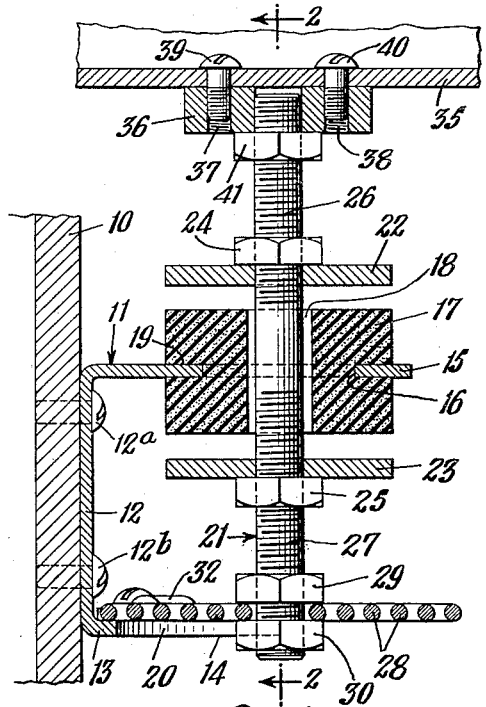
Fig. 1 represents a longitudinal sectional view taken through the first form of the invention, the coiled conical spring being shown in flat compressed condition and connected to the U-shaped supporting bracket and the bottom of the central post, with snubber plates located equidistant from a "doughnut"-shaped snubber under the load of the instrument mounted upon the upper end of said post.
Figure 2:
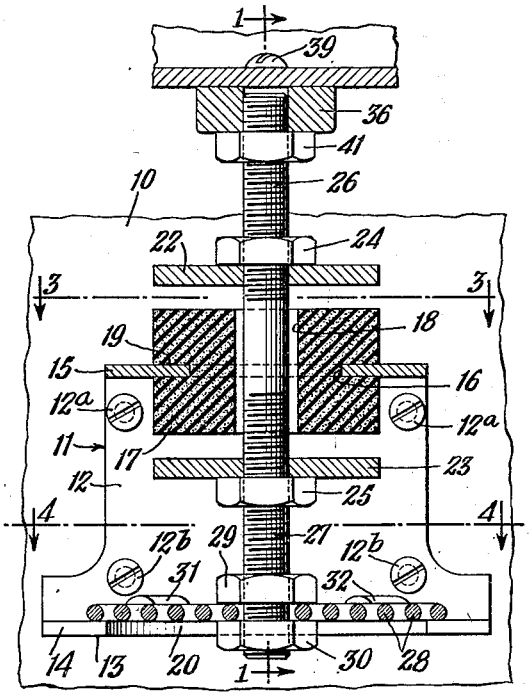
Fig. 2 is a longitudinal sectional view of the same taken along the line 2—2 of Fig. 1 at right angles from the view shown in Fig. 1.
Figure 3:
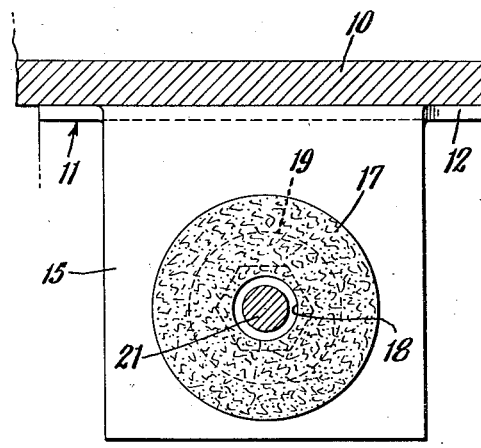
Fig. 3 is a transverse sectional view taken along the line 3—3 of Fig. 2, looking downwardly, and showing a top view of the snubber member.
Figure 4:
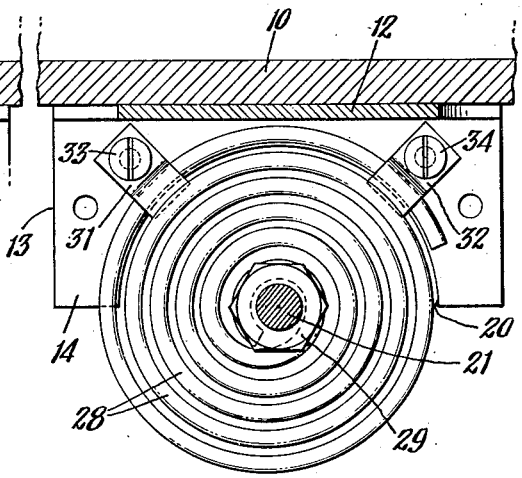
Fig. 4 is a transverse sectional view taken along the line 4—4 of Fig. 2, looking downwardly upon the flattened coil spring.

Referring now to the drawings in which like reference numerals denote corresponding parts throughout the several views, the numeral 10 indicates a vertical wall upon which is mounted a U-shaped bracket 11 having a vertical base 12 provided with apertures by means of which it may be secured to said wall 10 by a pair of screws 12a, 12b.

The bracket 11 is provided with a wide bottom portion 13 from which extends a horizontal arcuate wing 14. The top of the bracket 11 is provided with an upper horizontal rectangular wing 15 having a central aperture 16 for receiving a "doughnut"-shaped snubber 17 of fairly inelastic soft sponge natural rubber, or neoprene—said snubber member 17 having a hole 18 concentric with said aperture 16. The snubber member 17 has an exterior annular slot 19 which is adapted to fit snugly around the edge of the aperture 16 in the upper wing 15.

The arcuate wing 14 has a recess 20 which also is concentric with the aperture 16 in the upper wing 15. Provision is also made of an elongated vertical post 21 which passes through the aperture 16 and the hole 18, and is concentric therewith.

Surrounding the post 21 are a pair of internally threaded snubber disks 22, 23 which are adjustably secured to said post 21 by lock nuts 24, 25 engaging the top and bottom of said disks 22, 23 respectively and screwed on threaded sections 26, 27 of said post 21.

In order to absorb more or less steady vibrations, provision is made of a coiled conical spring 28 which is secured to the lower threaded section 27 of the post 21 by a pair of nuts 29, 30 which are adapted to clamp upon opposite sides of the center convolution of said spring 28.

The outer convolution of the spring is adapted to be secured to the lower arcuate wing 14 of the bracket 11 by means of a pair of grooved rectangular clips 31, 32 and a pair of screws 33, 34 passing through said clips.

The numeral 35 indicates the base of an instrument casing which is adapted to be detachably secured to the upper end of the post 21 by means of a top attaching plate 36, preferably of rectangular shape. The plate 36 is provided with a pair of tapped apertures 37, 38 through which a pair of screws 39, 40 are adapted to pass into the instrument base 35. The plate 36 is locked securely in position by means of a lock nut 41 located on said post below the plate 36.

Figure 5:
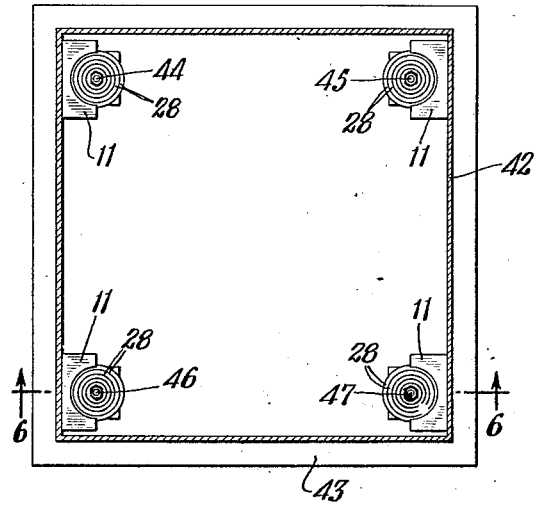
Fig. 5 is a top plan view, partly in section, of a modified form of instrument mounting in which four of the shock units of the first form of the invention have been installed in inverted position upon the instrument casing and attached to the opposite sides thereof.
Figure 6:
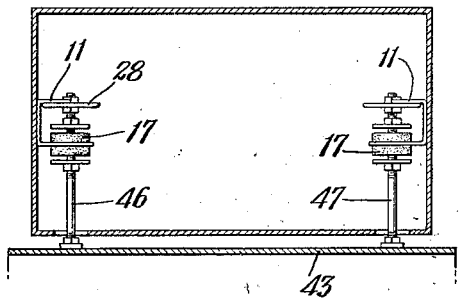
Fig. 6 is a transverse sectional view of the same taken along the line 6—6 of Fig. 5, and showing the posts of said shock absorbers rigidly supported at their lower ends upon a base below the instrument casing.

Figs. 5 and 6 illustrate a modified method of installation of four of the shock mounting units, in which four of the brackets 11 are attached to the interior of an instrument casing 42, and the bottoms of the posts are secured to a supporting base 43 mounted on a vehicle.

In this form of the invention the four posts 44, 45, 46, 47 of the brackets 11 are installed in inverted position, but in other respects all of the parts are identical with those shown in Figs. 1 to 4.

Under conditions of violent shock it will be understood that when the washer plates strike the snubbing members, work will be done in compressing the latter. Moreover, since the snubbing members are not very lively, the rebounds will occur at a very slow rate, thus effectively dampening oscillatory motions.

It will be understood that the snubbing washers or "doughnuts" may be adjusted on the central posts of the shock mounting units so as to be closer or farther away from the coiled springs, as determined by the type of shock and amplitude of vibrations expected.

The shock mounting unit of the present invention has the property of substantially equal stiffness in all directions and consequently serves to insulate the instrument chassis from the impressed vibrations received from the vehicle regardless of the planes in which they occur.

*Modified form*

Figure 7:
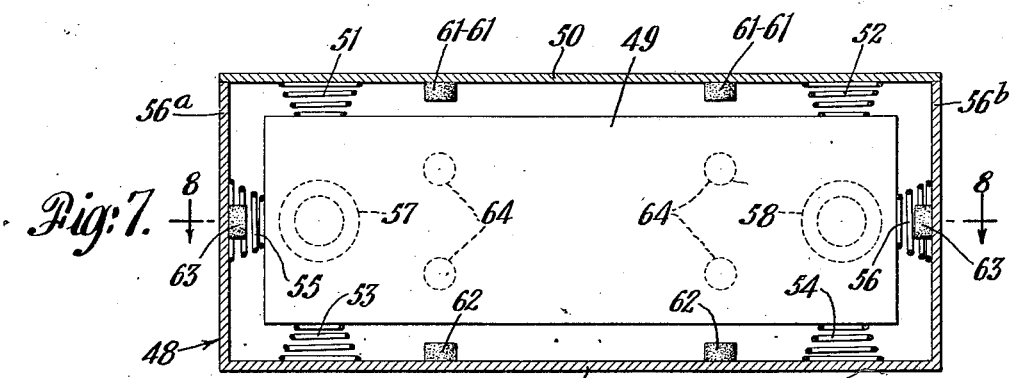
Fig. 7 is a side sectional view of a modified form of shock proof mounting in which an instrument casing is shown protected from shocks on its top, sides, ends, and bottom by separately mounted coiled springs and solid snubber members—the section being taken on the line 7—7 of Fig. 8.
Figure 8:
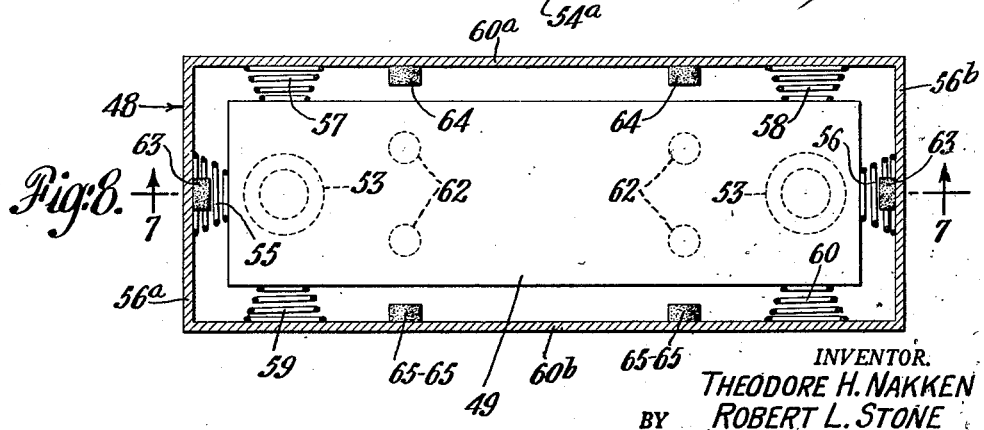
Fig. 8 is a top sectional view of the same, the section being taken along the line 8—8 of Fig. 7.

In the modified form of the invention shown in Figs. 7 and 8, the numeral 48 indicates an outer case for receiving a sensitive instrument 49, said case 48 being provided with a top cover 50 secured in position in any desired manner. In order to insulate the instrument from vibrations, provision is made of a pair of conical coiled springs 51, 52 on the cover 50, a similar pair of springs 53, 54 on the base 54a, two springs 55, 56 on the ends 56a, 56b and two pairs 57, 58 and 59, 60 of similar springs on the sides 60a, 60b of the case 48.

In order to absorb sudden shocks which may be received by the casing at more or less erratic intervals, provision is made of four cylindrical solid snubbers 61, 61, 61, 61 mounted upon the undersurface of the cover 50, four similar snubbers 62, 62, 62, 62 mounted upon the base 54a, a pair of snubbers 63, 63 located on the ends 56a, 56b, four side snubbers 64, 64, 64, 64 located on the side 60a and four side snubbers 65, 65, 65, 65 located upon the other side 60b of the casing 48.

The end snubbers 63, 63 are preferably located concentrically within the interior of the conical springs 55, 56 as shown.

While there have been disclosed in this specification several forms in which the invention may be embodied it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a vibration and shock mounting for a delicate instrument, a vertical post, a U-shaped bracket having a vertical base and horizontal upper and lower wings, a snubber attached to said upper wing, a pair of snubber plates attached to said post and located at equal distances above and below said snubber when said mounting is loaded, and a coiled conical spring connecting said lower wing with the bottom of said post and normally having all of its convolutions in one horizontal plane when said mounting is loaded.

2. A vibration and shock mounting as defined in claim 1, in which said spring is attached to the lower wing of said bracket by a pair of grooved clips secured to the outer convolution of said spring.

3. A vibration and shock mounting as defined in claim 1, in which means are provided for attaching the upper end of said post to the instrument, and the vertical base of said bracket to a supporting wall.

4. In a vibration and shock mounting for a delicate instrument, a U-shaped bracket having a vertical base and a pair of horizontal upper and lower wings, a vertical post passing loosely through said wings, a shock-absorbing snubber member attached to said upper wing, a pair of snubber plates attached to said post for engagement on opposite faces of said snubber member, and a conical coiled spring connecting said lower wing to one end of said post for absorbing vibrations impressed upon said shock mounting.

5. In a vibration and shock mounting for a delicate instrument, a vertical post, a U-shaped bracket having a vertical base and horizontal upper and lower wings, a snubber attached to said upper wing, and a pair of snubber plates attached to said post and located at equal distances above and below said snubber when said mounting is loaded.

6. In a vibration and shock mounting for a delicate instrument, a vertical post, a U-shaped bracket having a vertical base and horizontal upper and lower wings, a snubber attached to said upper wing, a pair of snubber plates attached to said post and located at equal distances above and below said snubber when said mounting is loaded, and resilient means connecting said lower wing to said post.

7. In a vibration and shock mounting between two objects, a vertical post, a bracket, a snubber loosely embracing said post and attached to said bracket, a pair of snubber plates attached to said post located above and below said snubber, and normally out of contact therewith, means for securing said post to one of said objects, and means for connecting said bracket to the other of said objects.

8. In a vibration and shock mounting between two objects, a vertical post, an angular bracket having a vertical section, and a horizontal section, a snubber loosely embracing said post and attached to said horizontal section, a pair of snubber plates attached to said post located above and below said snubber and normally out of contact therewith, resilient means for connecting said post with said bracket, means for securing said post to one of said objects, and means for connecting the vertical section of said bracket to the other of said objects.

THEODORE H. NAKKEN.
ROBERT L. STONE.